Aug. 27, 1957       C. MACHOVER       2,803,965
GYROSCOPE ERECTION CUTOUT AND RECYCLING DEVICE
Filed Nov. 10, 1955
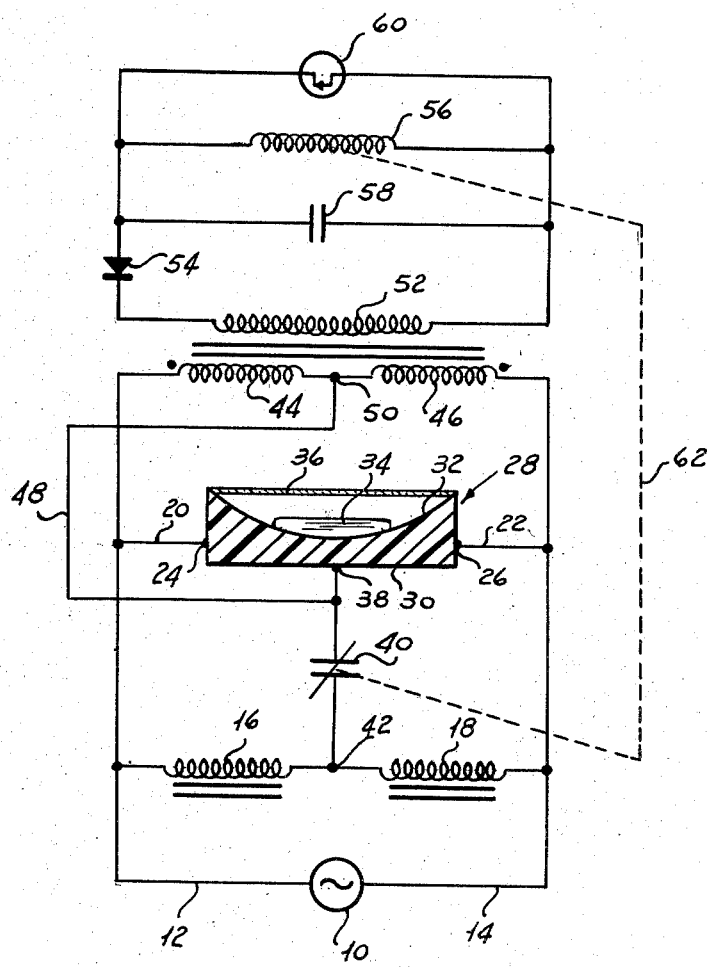
INVENTOR
CARL MACHOVER
BY Henry L. Shenier
ATTORNEY

United States Patent Office 2,803,965
Patented Aug. 27, 1957

2,803,965

GYROSCOPE ERECTION CUTOUT AND RECYCLING DEVICE

Carl Machover, Yorktown Heights, N. Y., assignor to Norden-Ketay Corporation, White Plains, N. Y., a corporation of Illinois Application November 10, 1955, Serial No. 546,124

6 Claims. (Cl. 74—5.41)

My invention relates to a gyroscope erection cutout and recycling device and more particularly to a gyroscope erection cutout and recycling device which is simpler in construction and more effective in operation than similar devices of the prior art.

Gyroscope erecting systems are known in the prior art for applying precessing torques to the gyroscope in response to deviations of the gyroscope about an axis. They may, for example, apply precessing torques which compensate for errors introduced in the system by changes in latitude. When certain unusual forces, such as the force of acceleration, are applied to the gyroscope, it is desirable that the erection system be cut out in order that excessive undesirable correcting torques not be applied to the gyroscope. Cutout devices are known in the prior art for temporarily disabling the gyroscope erection system during the occurrence of unusual forces for which the erection system is not designed to compensate. These devices of the prior art employ electronic amplifiers for amplifying an error signal to cause the cutout device to operate. As is known in the art, components of electronic amplifiers require replacement in a relatively short period of time. These cutout devices of the prior art also employ a number of relays which interrupt the erection system circuit and re-establish the circuit as soon as the acceleration ceases. It is desirable that the cutout device operate after a timed interval when the unusual force is applied to the gyroscope. I provide this time delay to prevent operation of the cutout device as a result of chatter or vibration of the aircraft carrying the device. The cutout device should, however, cease to function immediately upon cessation of the unusual force to render the erection system again operative.

I have invented a gyroscope erection cutout and recycling device which is simpler in construction and more effective in operation than are the cutout devices of the prior art. My device includes no amplifiers and employs only a single relay both to cut out and to recycle the erection system. My system is so arranged that the cutout device after being actuated ceases to function upon cessation of the force of acceleration.

One object of my invention is to provide a gyroscope erection cutout and recycling device which includes no electronic amplifiers.

A further object of my invention is to provide a gyroscope erection cutout and recycling device which includes only a single relay.

Other and further objects of my invention will appear from the following description.

In general, my invention contemplates the provision of a cutout and recycling device for a gyroscope erection system having gravity responsive means for producing a signal in response to deviation of the gyroscope about a selected axis. I provide normally inoperative means responsive to the signal for disabling the signal producing means and acceleration responsive means for rendering operative the normally inoperative means. My disabling construction is so constructed that upon cessation of the force of acceleration it immediately ceases to function and permits the erecting system again to operate.

The accompanying drawing which forms part of the instant specification and which is to be read in conjunction therewith is a schematic view of my gyroscope erection system cutout and recycling device.

More particularly referring now to the drawing, the gyroscope erection system with which my cutout and recycling device is used includes a suitable source 10 of alternating current potential. Respective conductors 12 and 14 connect the erection system precessing windings 16 and 18 in series across the source of potential 10. Conductors 20 and 22 connect respective terminals 24 and 26 of a gravity sensitive variable resistor, indicated generally by the reference character 28, between conductors 12 and 14. The gravity sensitive variable resistor 28 includes a body 30 formed of a suitable plastic resistive material or other resistive material such as carbon. Body 30 is provided with a concave surface 32 on which a pool of mercury 34 rests. I enclose the surface 32 by any appropriate means, such as a glass or plastic cover 36.

Resistor 28 includes a third terminal 38 located substantially at the center of the base of body 30. With the base of body 30 lying in a horizontal plane, the pool 34 of mercury normally rests in the center of the surface 32. When the mercury pool 34 of resistor 28 is so disposed, the resistance between terminals 24 and 38 is equal to the resistance between terminals 38 and 26. As the resistor tilts, pool 34 is displaced from the center of surface 32 and the resistances between the respective pairs of terminals 24 and 38 and 38 and 26 become unequal. It will be appreciated that this displacement of the mercury pool 34 on surface 32 also produces a resistance unbalance between terminals 24 and 38 and 38 and 26. This permits differential currents to flow through windings 16 and 18 to produce the erecting torque, as is known in the art.

I connect a normally closed relay switch 40 between terminal 38 of resistor 28 and the common terminal 42 of precessing windings 16 and 18. It will be understood that the gravity sensitive variable resistor 28 is carried by the Cardan ring or the like (not shown) that is on a stable plane with respect to which the precessing windings 16 and 18 are to act. When the mercury 34 is in the center of surface 32, the resistances between the respective pairs of terminals 24 and 38 and 38 and 26 divide the voltage of potential source 10 equally between them. As a result, equal potentials are applied to the respective windings 16 and 18 with the result that no net precessing force is applied to the gyroscope rotor. When the mercury pool 34 shifts from its central position, the voltages between the respective pairs of terminals 24 and 38 and 38 and 26 will be unequal, with the result that a net precessing force is applied to the gyroscope rotor.

When a temporary unusual force, such as the force of acceleration of an aircraft or the like, is applied to the gyroscope, mercury pool 34 shifts out of its central position on surface 32 a large amount. This excessive displacement of the mercury pool from its central position on surface 32 produces a highly undesirable precessing force from the operation of the erecting system. It is desirable that the erecting system be cut out during the application of such transient unusual forces to the gyroscope in order that no excessive, unwanted precessing torque be applied to the gyroscope rotor. This may conveniently be accomplished by opening the normally closed relay switch 40.

I connect a pair of oppositely wound windings 44 and 46 in series between conductors 12 and 14. A conductor 48 connects the common terminal 50 of windings 44 and 46 to terminal 38 of resistor 28. It will be seen that the same potentials are applied to the respective windings 44 and 46 as those which are applied to windings 16 and 18. Windings 44 and 46 form a primary winding of a transformer including a secondary winding 52. When unequal potentials are applied to windings 44 and 46 when pool 34 is displaced from its central position on surface 32, the difference between these potentials induces a potential in the secondary winding 52. Winding 52 steps up the voltage from the windings 44 and 46 to magnify the difference in potential between the respective pairs of terminals 24 and 38 and 38 and 26 resulting from a displacement of the mercury 34. I connect a rectifier 54, which may conveniently be a crystal, diode, or the like, to one terminal of winding 52. I connect the winding 56 associated with relay 40 between rectifier 54 and the other terminal of secondary winding 52. I connect a capacitor 58 across winding 56 for applying pulses of voltage to the winding 56. An acceleration sensitive threshold switch 60 normally short circuits winding 56. The difference between the potentials of the respective windings 44 and 46 induces a potential in winding 52 which is rectified by rectifier 54. If acceleration sensitive switch 60 is open, capacitor 58 applies the rectified voltage pulses to winding 56 to energize the winding. When energized, winding 56 operates a linkage 62 to open the normally closed relay switch 40 to interrupt the circuit between terminals 38 and 42. It is to be noted that the threshold mercury switch 60 is carried on the same Cardan ring or the like as is the gravity sensitive resistor 28. I arrange switch 60 to open on the occurence of a predetermined value of acceleration. Normally switch 60 shorts winding 56 so that the rectified voltage pulses from rectifier 54 do not energize winding 56.

In operation of my gyroscope erection cutout and recycling device, threshold switch 60 is normally closed during normal erecting operations and the erection system functions normally. When the mercury 34 shifts from its central position on surface 32, unequal resistances are produced between the respective pairs of terminals 24 and 38 and 38 and 26. Since the resistances are unequal, they divide the voltage of the potential source 10 unequally to create a resultant precessing force from windings 16 and 18. The direction and amount of the precessing force are such as to compensate for errors being introduced into the system. Windings 44 and 46 are energized proportionally to windings 16 and 18. Any difference between the respective potentials of windings 44 and 46 induces a signal in winding 52 which is rectified by rectifier 54. Normally closed switch 60 shorts these rectified voltage pulses to prevent energization of winding 56.

When the gyroscope member carrying switch 60 and resistor 28 is subjected to the action of an unusual force, such as the force of acceleration of an aircraft or the like, switch 60 opens. At the same time pool 34 shifts a large amount to produce a large difference between the respective potentials of windings 44 and 46 to induce a voltage in winding 52. This voltage is rectified by rectifier 54 and the rectified pulses are applied to winding 56 by capacitor 58. Switch 60, being open, permits this energization. When energized, winding 56 operates linkage 62 to open relay switch 40 and to disconnect terminal 42 from terminal 38 of the gravity sensitive voltage dividing resistor 28. Capacitor 58 and winding 56 provide an electrical inertia so that winding 56 is not energized for a timed interval, which is a function of the accelerating force, after the accelerating force is applied to the device.

It is will appreciated that in my assembly I desire to cut out the erection system during periods of excessive acceleration and deceleration. When the acceleration which produces the cutout of the erection just described ceases, it is necessary that the operation of the erection system be again permitted. As soon as acceleration drops to a point at which threshold switch 60 closes, the relay winding 56 is short circuited. This permits relay switch 40 to close and the erecting system again functions normally. At this time the precessing torque will be applied to bring the spin axis of the gyroscope to its erected position.

It will be seen that resistor 28 together with windings 16 and 18 form a means for producing a first signal in response to a deviation of the gyroscope spin axis from a predetermined direction. Windings 44, 46 and 52 constitute a means for producing a signal proportional to the first signal. Winding 56 and its associated switch 40 are a normally inoperative means responsive to the signal generated in winding 52 for disabling the means including resistor 28 and windings 16 and 18. Threshold switch 60 is a means responsive to a predetermined acceleration for rendering the winding 56 and associated switch 40 operative.

It will be seen that I have accomplished the objects of my invention. I have provided a gyroscope erection cutout and recycling device which automatically cuts out and recycles a gyroscopoe erection system. My device includes no amplifiers and employs only a single relay. My device is simpler in construction and more effective in operation than are similar devices of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. In a gyroscope erection system having means for producing a first signal in response to deviations of a gyroscope spin axis from a predetermined direction, a cutout and recycling device including means for producing a signal proportional to said first signal, normally inoperative means responsive to said proportional signal for disabling said first signal producing means and means responsive to a predetermined acceleration for rendering operative said normally inoperative means.

2. A cutout and recycling device as in claim 1 in which said normally inoperative means includes a relay winding, and means responsive to said proportional signal for applying a potential to said relay winding, said means responsive to a predetermined acceleration including a normally closed acceleration sensitive switch connected across said relay winding.

3. An erection system for a gyroscope including in combination means for producing an erecting signal in response to deviations of the gyroscope spin axis from the vertical, means for producing a signal proportional to said erecting signal, normally inoperative means responsive to said proportional signal for disabling said erecting signal producing means, and means responsive to a predetermined acceleration for rendering operative said normally inoperative means.

4. A gyroscope erection system as in claim 3 in which said erecting signal producing means includes a source of electrical potential, a gravity sensitive voltage divider connected across said source, said gravity sensitive voltage divider having a resistance mid-point when said divider lies in the horizontal plane, a pair of precessing windings series connected across said source to have a common terminal, said normally inoperative means including a normally closed relay switch connected between said resistance mid-point and said common terminal.

5. A gyroscope erection system as in claim 3 in which said normally inoperative means includes a relay winding, a rectifier, means connecting said relay winding and said rectifier in series across said proportional signal producing means, and a capacitor connected across the relay winding.

6. A gyroscope erection system as in claim 3 in which said erecting signal producing means includes a source of electrical potential, a gravity sensitive voltage divider connected across said source, said gravity sensitive voltage divider having a resistance mid-point when lying in a horizontal plane, a pair of precessing windings series connected across said source to have a common terminal, said normally inoperative means including a normally closed relay connected between said resistance mid-point and said common terminal, a relay winding, and means connecting said relay winding to said proportional signal producing means.

References Cited in the file of this patent

UNITED STATES PATENTS

| | | |
|---|---|---|
| 2,339,606 | Sias | Jan. 18, 1944 |
| 2,409,188 | Braddon et al. | Oct. 15, 1946 |
| 2,542,975 | Adkins | Feb. 27, 1951 |